United States Patent [19]
Mori et al.

[11] 3,831,918
[45] Aug. 27, 1974

[54] HEAT INSULATING DURABLE TUYERE

[75] Inventors: Keisuke Mori; Takehiro Yamada, both of Kisarazu; Katsumi Nakamoto, Kimitsu; Hirosi Onaka; Takeshi Yamamoto, both of Tokyo; Taizo Kato, Yokohama, all of Japan

[73] Assignees: Nippon Steel Corporation; Asahi Glass Company Limited, both of Tokyo, Japan; part interest to each

[22] Filed: June 13, 1973

[21] Appl. No.: 369,595

[30] Foreign Application Priority Data
June 13, 1972 Japan.................................. 47-58119

[52] U.S. Cl. ................................................ 266/41
[51] Int. Cl. ............................................ C21b 7/16
[58] Field of Search................. 110/182.5; 122/6.6; 266/35, 36 P, 41

[56] References Cited
UNITED STATES PATENTS
1,849,718  3/1932  Ledbetter ........................... 266/41
3,043,578  7/1962  Cohn .................................. 266/41
3,061,300  10/1962 Schultz ............................... 266/41
3,069,760  12/1962 Schultz ....................... 110/182.5 X
3,341,188  9/1967  Armour et al. ..................... 266/41
3,558,119  1/1971  Demalander........................ 266/41
3,589,318  6/1971  Szatkowski ........................ 266/41

Primary Examiner—Gerald A. Dost

[57] ABSTRACT

A low expansion ceramic lining is formed on the inner surface of the combustion gas inlet of a tuyere. The low expansion ceramic lining is made of a material which has a thermal expansion coefficient less than 0.5 percent. The low expansion ceramic lining is preferably formed on the inner surface of the tuyere by cementing a low expansion ceramic tube onto the tuyere with a cement consisting of a low expansion ceramic cement or a castable refractory material.

4 Claims, 3 Drawing Figures

(a)   (b)

HEAT INSULATING DURABLE TUYERE

BACKGROUND OF THE INVENTION

1. Field of the Invention

This invention relates to a tuyere for the blow inlet of a blast furnace. More particularly, it relates to a durable heat insulating tuyere for use in the blow inlets of a blast furnace.

2. Description of the Prior Art

In order to supply hot air or fuel at high temperatures under high pressures to blast furnaces or other iron melting furnaces, tuyeres possessing certain physical characteristics must be provided. The tuyeres of the blast furnaces are generally made of copper and each blast furnace is normally equipped with about 25 – 35 tuyeres. The tuyeres must be durable at high temperatures and under high pressures and also must be able to resist corrosion which is caused by molten pig iron or molten slag or by the abrasion caused by fine coke particles. Accordingly, tuyeres have been usually protected with cooling water and the outer surfaces of the tuyeres which are exposed to the corroding environments have been protected by ceramic coatings. Although a certain degree of protection has been achieved with these measures, the degree of protection offered by the conventional methods is insufficient. As a matter of practical application, the inner surfaces of the hot gas blow inlets of the tuyeres have not been protected by anything except cooling water.

It has been found that the conventional methods of affording protection from oxidation or abrasion for the inner surfaces of the tuyeres has been insufficient largely because of ignorance concerning the problems associated with the corrosive environments. Since conventional tuyeres have been cooled with water, the heat loss of the hot gas supplied to the furnaces has been high which has resulted in substantial decreases in the temperatures of the hot air from the combustion of gases passed into the furnaces. With recent technical advances, high combustion velocities at the top of the tuyeres have been attained by the methods of injecting heavy oils and oxygen rich gases into the furnaces. These method have resulted in severe damage to the tuyeres. In addition, when tuyeres of copper have been used, radiant energy from the inner surfaces of the tuyeres has not been effectively used and the maximum temperature for the injection of heavy oil has been limited because of the low temperatures on the inner surfaces of the tuyeres which must be used.

A need, therefore, exists for a method and material for fabricating the inner surfaces of tuyeres which overcomes the limitations imposed by conventional copper tuyeres.

SUMMARY OF THE INVENTION

Accordingly, one object of this invention is to provide a heat insulating tuyere which has low thermal heat loss.

Another object of this invention is to provide a durable tuyere having excellent oxidation resistance, abrasion resistance and corrosion resistance.

Yet another object of this invention is to provide a tuyere for supplying hot gases steadily and quickly to blast furnaces.

Briefly, these objects and other objects of the invention as hereinafter will become readily apparent can be attained by providing a tuyere whose inner surfaces are protected from the passage of hot combustion gas by a cover of a low expansion ceramic lining.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The tuyere of this invention protected with the low expansion ceramic lining has an excellent ability to resist oxidation, abrasion and cracking. The durability of the inner surfaces of conventional blast furnace tuyeres has been about 6 months. However, the durability period of the tuyeres of this invention has been doubled to about one year.

The economical thermal effects of the tuyere of this invention are now described in detail. The temperature of the cooling water in the tuyere of this invention increases about 5°C compared to the temperature increase of 8° – 12°C of the cooling water in the conventional tuyere. As a result, the temperature of the hot gases (combustion gases) supplied to blast furnaces can be increased about 30° – 40°C over the temperature of the gases of conventional systems. This means from a process point of view that 4 – 5 kg of coke can be saved per ton of pig iron. This results in substantial process savings. The temperatures of the inner surfaces of the tuyere of this invention can be over 1,000°C which means that no carbon deposits are found on the copper tuyere, the combustibility of the fuel is increased and the tuyeres are not damaged by carbon deposits.

By controlling the shape of the low expansion ceramic lining on the inner surface of the tuyere of this invention, the blowing velocity of the hot combustion gases can be controlled and substantially increased in comparison to the gases of conventional processes.

Figure 1:
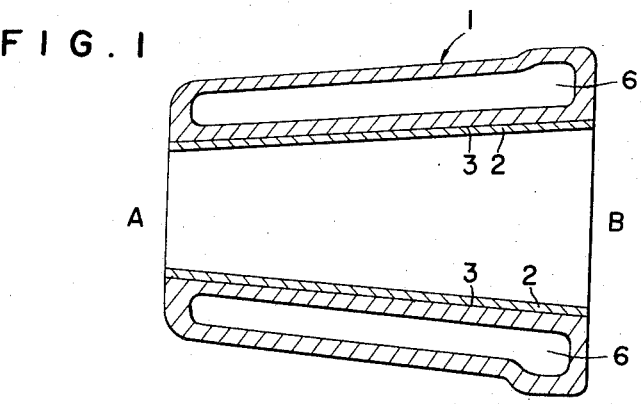
FIG. 1 is a sectional view of one embodiment of the tuyere of this invention.

FIG. 1 is a sectional view of the tuyere 1 in which a low expansion ceramic lining 2 is formed on the inner surface 3 of the tuyere. The low expansion ceramic lining can be formed by using a prefabricated tube or molding a cement-like ceramic material on the inner surface of the tuyere or coating a cement-like ceramic material on the inner surface of the tuyere by extruding the material through a perforated drum under pressure. The ceramic lining can be bonded on the inner surface of the metallic tuyere directly, indirectly or partially by a sintering or during operation.

Figure 2:
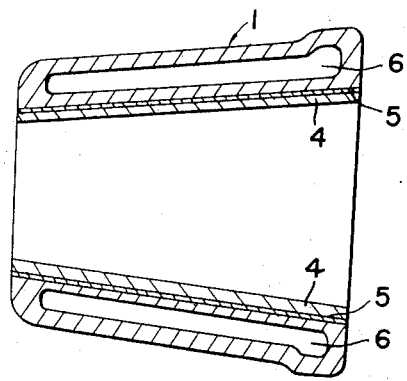
FIG. 2 is a sectional view of another embodiment of the tuyere of this invention.

FIG. 2 is a sectional view of the preferred embodiment of the tuyere of this invention in which a low expansion ceramic tube 4 is bonded on the inner surface of the tuyere with a cement such as a low expansion ceramic cement or refractory castable material 5. The tuyere of FIG. 2 can be prepared by inserting the low expansion ceramic tube 4 in the tuyere 1 and then filling the space between the tube 4 and the tuyere 1 with a ceramic cement or a refractory castable material or by inserting a low expansion ceramic tube which has been coated with the cement or the refractory castable material on the outer surface of the tube.

In FIGS. 1 and 2, a passage 6 for cooling water is formed in the tuyere 1. The reference letter A designates the furnace side of the tuyere 1 and B designates the hot gas inlet side.

The processes of forming the low expansion ceramic lining of this invention are not limited to the examples shown in the drawings, and it can be formed into various shapes. For example, the ceramic lining can be formed on particular areas of the tuyere but, preferably the inner high temperature portions of the tuyere which are in contact with the flame or on the outer surfaces of the top of the tuyere. Indeed, the ceramic lining can be formed in almost any shape desired. It is also possible to combine two or more pieces of a ceramic lining to form the inner surface of the tuyere. The shape of the ceramic lining is determined by the control of the hot gas desired and the speed of the hot gas. Usually, the thickness of the low expansion ceramic lining is in the range of 2 – 20 mm, preferably 4 – 15 mm. The thickness is normally determined by the physical properties of the ceramic lining material desired.

The low expansion ceramic material should have certain characteristics such as a low thermal expansion coefficient less than 0.5 percent, preferably less than 0.3 percent of the thermal expansion coefficient at 1,000°C. (Hereinafter it is to be implied that whenever low thermal expansion coefficient percentages are given, the percentages relate to the thermal expansion coefficient at 1,000°C.) The ceramic linings are subjected to tremendous forces which lead to deterioration and cracking of the lining because of the extreme temperature differential between the water cooled metal of the tuyere and the portions of the lining which come into contact with the combustion gas. The purposes of this invention can not be obtained if the thermal expansion coefficient of the ceramic is high. (The thermal expansion of the metal portion of the tuyere in contact with the ceramic is negligible because the metal is cooled with water.) In the manufacture of the low expansion ceramic lining, the raw material used comprises a principal component of $Li_2O \cdot Al_2O_3 \cdot nSiO_2$ crystals ($n = 2 – 10$) such as spodumene or petalite having a thermal expansion coefficient less than 0.2 percent which is admixed with alumina cement or clay if necessary, and kneaded with water. The mixture is then molded and allowed to solidify. It is also possible to use a mixture of an $Al_2O_3$ — $SiO_2$ material and a lithium component to form the $Li_2O \cdot Al_2O_3 \cdot nSiO_2$ crystals mentioned above. A suitable ceramic tube can be prepared by sintering the solidified product obtained at 1,200°C – 1,300°C. Alternatively, the ceramic tube can be formed from cordierite ($2MgO \cdot 2Al_2O_3 \cdot 5SiO_2$) which has a thermal expansion coefficient less than 0.5 percent. Cordierite ($2MgO \cdot 2Al_2O_3 \cdot 5SiO_2$) has a greater heat resistance than $Li_2O \cdot Al_2O_3 \cdot nSiO_2$ materials and is used with significant advantages in the tuyeres of blast furnaces operating at higher temperatures. Preferably, the low expansion ceramic lining is a mixture of from 70 – 95 percent by weight of a low expansion ceramic powder having a thermal expansion coefficient less than 0.5 percent and from 30 – 5 percent by weight clay.

The low expansion ceramic cement used for forming the lining is a cement material having a thermal expansion coefficient less than 0.5 percent which is extrudable, moldable and coatable. The cement can be a mixture of a low thermal expansion powder and cement. Suitable low thermal expansion powders include $Li_2O \cdot Al_2O_3 \cdot nSiO_2$ ($n = 2 – 10$) materials such as spodumene and petalite which have thermal expansion coefficients less than 0.2 percent. A similar low thermal expansion powder can also be prepared when an $Al_2O_3$ — $SiO_2$ material such as pyrophyllite is admixed with a lithium component such as $Li_2CO_3$, sintered and crushed. It is also possible to use cordierite ($2Al_2O_3 \cdot 2MgO \cdot 5SiO_2$) which has a thermal expansion coefficient less than 0.5 percent, as a powder.

Preferably, alumina cement is used as the cement ingredient in the low expansion ceramic cement composition because it imparts high heat resistance and high temperature strength to the composition. Other fine powders can be added to the composition as low expansion moldable materials, depending upon the requirements demanded of the cement composition.

When the cement is used, preferably the low expansion powder and the cement are used in quantities which give a mixture which has a thermal expansion coefficient less than 0.5 percent. This results in a material which undergoes minimal thermal stress and which does not crack under high temperature differences. It is preferable to use a composition containing from 50 – 88 percent by weight of the low expansion powder and 50 – 12 percent by weight of the cement.

In the optimum or preferred embodiment of the invention as shown in FIG. 2, the cement is used to bond the prefabricated low expansion ceramic tube to the inner surface of the tuyere. However, the low expansion ceramic tube can be formed on the inner surface of the tuyere by various methods without using the cement. Generally, when the low expansion ceramic lining tube is bonded to the tuyere, a ceramic cement such as alumina cement, Portland cement, low expansion cement, or refractory castable materials are suitable as bonding agents. Preferably, the bonding agent is a heat resistant and heat conductive material containing SiC, and the like, because the cooling effect of the water cooled tuyere on the low expansion lining can be increased by increasing the heat conductivity of the bonding agent. Also the integrity of the tuyere can be maintained by the bonding agent even though the low expansion ceramic lining may have been damaged over long operating periods. It is especially preferable to use a ceramic cement containing from 15 – 70 percent SiC. In the formation of the low expansion ceramic lining, alumina, chamotte, Carborundum, clay, and the like can be used together with the low expansion ceramic material.

Having generally described this invention, a further understanding can be obtained by reference to certain specific examples which are provided herein for purpose of illustration only and are not intended to be limiting unless otherwise specified.

EXAMPLE

The following combination of ingredients were used as the raw materials for the formation of a series of low expansion ceramic linings.

| Sample | 1 | 2 | 3 | 4 | 5 | 6 |
|---|---|---|---|---|---|---|
| $Li_2O \cdot Al_2O_3 \cdot 4SiO_2$ (note 1) (powder under 200 mesh) | 70 | 60 | 90 | 0 | 35 | 80 |
| $2MgO \cdot Al_2O_3 \cdot 5SiO_2$ (note 2) (powder under 200 mesh) | 0 | 0 | 0 | 70 | 0 | 0 |
| Clay (powder under 200 mesh) | 0 | 0 | 10 | 0 | 0 | 20 |
| Chamotte (powder under 200 mesh) | 0 | 10 | 0 | 0 | 0 | 0 |
| SiC (powder under 200 mesh) | 0 | 0 | 0 | 0 | 40 | 0 |
| Alumina cement (note 3) | 30 | 30 | 0 | 30 | 25 | 0 |

(Note 1): A pyrophyllite material (20.8% $Al_2O_3$, and 73.5% $SiO_2$, ignition loss 5%) was admixed with 15% $Li_2CO_3$ and the mixture was sintered at 1380°C for 3 hours. The resulting clinker was crushed to yield spodumene type products having a thermal expansion coefficient of $-1.0 \times 10^{-6}$/°C.
(Note 2): The raw materials of MgO, $Al_2O_3$, $SiO_2$ were mixed in the predetermined molar ratio indicated by the composition and were sintered at 1250°–1300°C for 5–10 hours. The resulting clinker was crushed.
(Note 3): The alumina cement consisted mainly of Ca-aluminate crystals having a formula of 75% $Al_2O_3$, 0.1% $SiO_2$, 0.3% $Fe_2O_3$, 24% CaO and 0.5% MgO.

Figure 3:
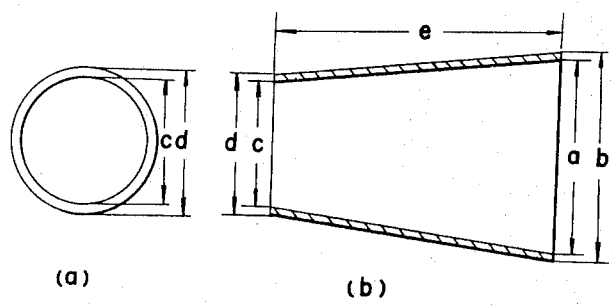
FIG. 3 is a sectional view of the low expansion ceramic tube used in the tuyere of this invention.

A series of tubes were formed from the six compositions shown in the table by mixing the raw materials with about 20% water with stirring, and molding the mixture in a gypsum mold with vibration to form tubes having the dimensions shown in FIG. 3 wherein $a$ is 176mm, $b$ is 190mm, $c$ is 136mm, $d$ is 150mm and $e$ is 450mm. The properties of the resulting tubes are as follows.

| Sample | 1 | 2 | 3 | 4 | 5 | 6 |
|---|---|---|---|---|---|---|
| Bulk density | 1.72 | 1.71 | 1.57 | 1.72 | 1.87 | 1.59 |
| Apparent porosity (%) | 32.1 | 33.1 | 31.7 | 34.0 | 34.2 | 32.2 |
| Thermal expansion coefficient (1200°C sintered) (%) | | | | | | |
| 0°C | 0.0 | 0.0 | 0.0 | 0.0 | 0.0 | 0.0 |
| 200°C | 0.01 | 0.03 | 0.0 | 0.05 | 0.02 | 0.0 |
| 600°C | 0.1 | 0.15 | 0.01 | 0.2 | 0.15 | 0.03 |
| 1000°C | 0.2 | 0.3 | 0.09 | 0.4 | 0.3 | 0.12 |
| Thermal conductivity (1200°C sintered) (kcal/m·hr·°C)600°C | 0.6 | 0.6 | 0.5 | 0.6 | 0.9 | 0.5 |

The raw materials of Sample 1 or 5 were admixed with 20% water to prepare a cement, and the cement was coated on the outer surface of a ceramic tube in a thickness of about 3mm. The low expansion ceramic tube coated with the cement was inserted into a tuyere to form the ceramic lining. The tuyere was used in a blast furnace to supply hot gases at a temperature of from 1,270° – 1,350°C. The results were as follows.

1. Temperature rise of the cooling water in the tuyere:
   An average of about 4° – 6°C for each month. (about 8° – 12°C when no lining is present.)
2. Temperature rise in the combustion chamber of the blast furnace:
   30° – 40°C higher than those tuyeres with no lining.
3. Crack formation and cleavage:
   No cracks or cleavages formed in more than 3 months.
4. Rate of melting loss:
   Substantially no loss for 3 months.
5. Protection of tuyere metal:
   Complete.
6. Life:
   The life of the lining was in excess of 3 months in a blast furnace subjected to the severest conditions, while the life was greater than 6 months under the usual blast furnace conditions.

When a Ca-silicate type cement was used as the cement or when a castable refractory material (less than 150 mesh size of a granular material of 70% $Al_2O_3$, 5% clay and 25% alumina cement or a granular material composed of 25% $Al_2O_3$ (less than 150 mesh), 40% SiC (less than 200 mesh), 10% $Li_2O \cdot Al_2O_3 \cdot 4SiO_2$ powder and 25% of an alumina cement) was used as the bonding agent instead of the cement, similar economical thermal effects were provided.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A modified tuyere for use in a blast furnace, which comprises:
   the formation of a low expansion ceramic lining of a material selected from the group consisting of $Li_2O \cdot Al_2O_3 \cdot n SiO_2$, wherein n is 2–10 and $2 MgO \cdot 2 Al_2O_3 \cdot 5 SiO_2$ on the inner surface of the tuyere which forms the passage for hot combustion gases injected into said blast furnace.

2. The tuyere of claim 1 wherein the low expansion ceramic lining is composed of 50 – 88% by weight of $Li_2O \cdot Al_2O_3 \cdot nSiO_2$, wherein n is 2 – 10 and 50 – 12% by weight alumina cement.

3. The tuyere of claim 1 wherein the low expansion ceramic lining is composed of 70 – 95% by weight of a low expansion ceramic powder having a thermal expansion coefficient less than 0.5% of the thermal expansion coefficient at 1,000°C and 30 – 5% by weight clay.

4. The tuyere of claim 1, wherein the low expansion ceramic lining is bonded to said tuyere with a ceramic cement or a refractory castable material containing 15 – 70% by weight SiC.

* * * * *